United States Patent [19]

Marsh

[11] 3,736,579

[45] May 29, 1973

[54] CIRCULAR MAGNETIC DOMAIN DEVICES

[75] Inventor: Anthony Marsh, Blisworth, England

[73] Assignee: Plessey Handel Und Investments A.G., Zug, Switzerland

[22] Filed: Feb. 2, 1972

[21] Appl. No.: 222,747

[52] U.S. Cl. .340/174 TF, 340/174 CB, 340/174 VA

[51] Int. Cl. .............................................G11c 11/14

[58] Field of Search.................................340/174 TF

[56] References Cited

OTHER PUBLICATIONS

IBM Technical Disclosure Bulletin Vol. 13, No. 11 Apr. 1971 pp. 3307–3308.

*Primary Examiner*—James W. Moffitt

*Attorney*—Samuel Scrivener, Jr., N. Douglas Parker, Jr., David S. Scrivener et al.

[57] ABSTRACT

A circular magnetic domain device which includes a layer of uniaxial magnetic material formed on or in a surface of a magnetic member having at least one easy magnetization direction substantially parallel to the said surface thereof, the layer material having a single unique easy magnetization direction substantially normal to the said surface. A first pattern of a soft magnetic material is interposed between the uniaxial magnetic layer and the magnetic member, and a pattern of an electrically conductive material is formed on the upper surface of the uniaxial magnetic layer. The magnetic member can be formed on the surface of a non-magnetic substrate, and a second soft magnetic pattern can be formed on the upper surface of the uniaxial magnetic layer. The second soft magnetic pattern can be complimentary to, and in register with, the first pattern in order to obtain higher propagation rates for the circular magnetic domains.

10 Claims, 8 Drawing Figures

FIG. 1
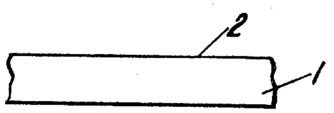
FIG. 2A
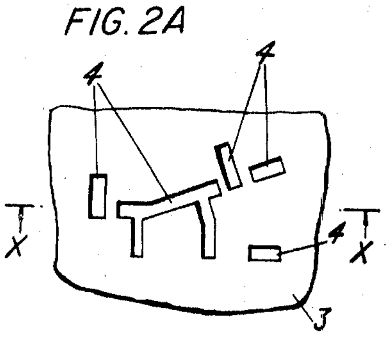
FIG. 2B
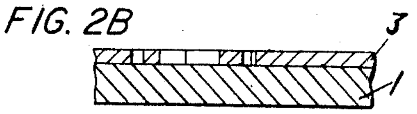
FIG. 3
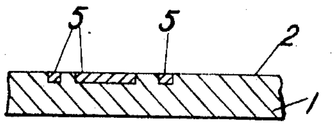
FIG. 4A
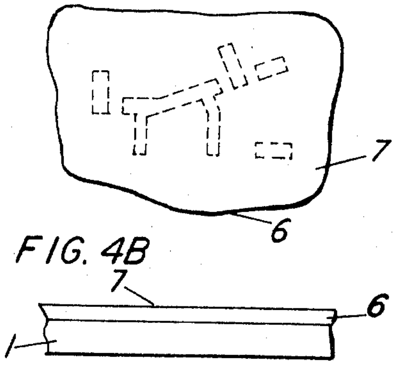
FIG. 4B
FIG. 5A
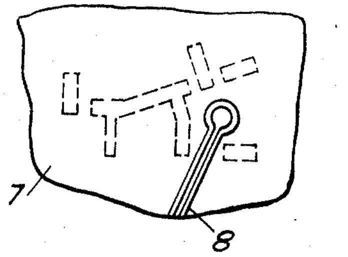
FIG. 5B
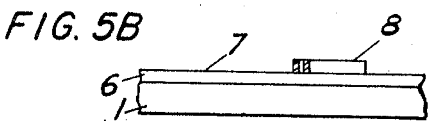

CIRCULAR MAGNETIC DOMAIN DEVICES

The invention relates to circular magnetic domain devices and to methods of producing the devices.

In a circular magnetic domain device, circular magnetic domains are generated in a thin layer of uniaxial magnetic material having a single unique easy magnetization direction substantially normal to a major surface thereof, and caused to propagate within the uniaxial magnetic layer along a predetermined path or paths. A read-out arrangement converts the circular magnetic domains into electrical impulses.

The manner in which circular magnetic domains are generated and caused to propagate within the thin uniaxial magnetic layer is described by A. H. Bobeck et al. in the I.E.E.E. Transactions on Magnetics, Volume MAG. 5, No. 3, September, 1969 at pages 544 to 565.

The invention provides a circular magnetic domain device including a layer of uniaxial magnetic material formed on or in a surface of a magnetic member having at least one easy magnetization direction substantially parallel to the said surface thereof, the layer material having a single unique easy magnetization direction substantially normal to the said surface; a first pattern of a soft magnetic material interposed between the uniaxial magnetic layer and the magnetic member; and a pattern of an electrically conductive material formed on the upper surface of the uniaxial magnetic layer.

The invention also provides a method of producing a circular magnetic domain device including the steps of providing a magnetic member having at least one easy magnetization direction substantially parallel to a major surface thereof; selectively diffusing the said major surface with a chemical or element to form a first pattern of a soft magnetic material in the said major surface; forming a layer of uniaxial magnetic material over the first pattern, the layer material having a single unique easy magnetization direction substantially normal to the said major surface; and forming a pattern of an electrically conductive material on the upper surface of the uniaxial magnetic layer.

The soft magnetic pattern can form part of the means which effect the generation of circular magnetic domains within the layer of uniaxial magnetic material, or the means which cause the generated magnetic domains to propagate along the layer in a predetermined path or paths, or the read out arrangement, or any two or all of these functions. If the soft magnetic pattern does not provide all of these functions or if propagation means are required both above and below the layer of uniaxial magnetic material in order to obtain, in a manner to be subsequently outlined, higher propagation rates for the circular magnetic domains then a pattern of a soft magnetic material can be formed on the upper surface of the layer of uniaxial magnetic material to provide the necessary functions.

The foregoing and other features according to the invention will be better understood from the following description with reference to the accompanying drawings in which:

FIGS. 1, 2A, 2B, 3, 4A, 4B, 5A and 5B diagrammatically illustrate the various stages of a method of producing part of a circular magnetic domain device.

In circular magnetic domain devices, the thin layer of uniaxial magnetic material within which the circular magnetic domains are generated and caused to propagate along a predetermined path or paths is, in general, a single crystal layer but, as outlined in our co-pending patent application No. 46623/71 Ser. No. 293,755 filed Sept. 29, 1972 by Anthony March, the thin layer can be polycrystalline or amorphous providing the crystallites are of a maximum diameter that is at least one order of magnitude less than the width of the wall of the circular magnetic domains.

The circular magnetic domains are, as is described in detail in the previously cited I.E.E.E. Transactions, generated within, and caused to propagate along, the thin uniaxial magnetic layer by means of a magnetically permeable circuit. Similarly, the read-out arrangement, for example, the read-out arrangement outlined in our co-pending patent application No. 39838/70 Ser. No. 166,751 filed July 28, 1971 by Anthony Marsh, can be constituted, at least in part, by a magnetically permeable circuit. In practice, the, or each permeable circuit is constituted by a pattern of soft magnetic material, for example, isotropic Permalloy, formed on a major surface of the thin uniaxial magnetic layer.

In the method according to the present invention the thin uniaxial magnetic layer is formed by any known technique on a major surface of a substrate which is of either a non-magnetic material or a magnetic material having at least one easy magnetization direction substantially parallel to a major surface thereof. The substrate which is illustrated, in part, in a side elevation in FIG. 1 of the drawings, is, in the case of a single crystal uniaxial magnetic layer, of a material which will enhance the development of the single crystal layer such that it is free from growth faults that would be liable to affect its magnetic properties.

Prior to the formation of the thin uniaxial magnetic layer, the magnetic permeable circuit, previously mentioned, is formed in the major surface of the substrate by selectively diffusing the major surface with a chemical compound or element that is capable of modifying the properties of the substrate to produce a soft magnetic pattern in the major surface with no well defined easy axis for the magnetic vector.

For example, in the production of the read-out arrangement outlined in our co-pending patent application Ser. No. 166,751 by the method outlined in the preceding paragraphs, it is necessary to treat the substrate 1 of FIG. 1 in a manner as is diagrammatically illustrated in FIGS. 2 to 4 of the drawings.

Referring to FIGS. 2(A) and 2(B) which diagrammatically illustrate in a plan view and cross-sectional side elevation respectively one stage of the production of a read-out arrangement for a circular magnetic domain device, the major surface 2 of the substrate 1 of FIG. 1 is provided with a mask 3, which is of a material that is capable of blocking the diffusion of the modifying chemical or element, and which exposes those areas 4 of the major surface 2 where diffusion is required to be effected. The mask 3 can be of any known type for example, a silicon oxide mask or a photolithographic mask.

After the formation of the mask 3, the exposed areas 4 are diffused with the modifying chemical or element to a predetermined depth, and the mask 3 is then removed in a known manner to leave the structure which is diagrammatically illustrated in a cross-sectional side elevation in FIG. 3 of the drawings.

The diffusion of the modifying chemical or element into the major surface 2 can be effected from a vapor or some other concentrated phase outside the substrate surface. The actual depth of the diffused areas 5 of FIG. 3 which define the magnetically permeable circuit is determined by the modifying chemical used and the diffusion parameters.

As illustrated in FIGS. 4(A) and 4(B) in a plan view and cross-sectional side elevation respectively, a thin uniaxial magnetic layer 6 is then formed by any known technique on the major surface 2 and over the diffused areas 5.

Thus with this part of the method according to the invention, a single structure is obtained which consists of a substrate, a magnetic permeable circuit, and a thin uniaxially magnetic layer.

When the uniaxial magnetic layer is deposited onto a surface of a substrate, i.e., with a permeable circuit in the substrate surface, the only constraints on the layer material are those that are necessary to cause stability for stationary and moving circular magnetic domains performing device and circuit functions.

As a single crystal layer, the uniaxial magnetic layer material can be either

*a.* a garnet structure with a formula $R_3$ $(Fe,M)_5O_{12}$, where R is a single or a mixture of rare earth ions including yttrium, and M is a non-magnetic ion such as aluminum or gallium. A material of this type is described by E. A. Giess et al. in Materials Research Bulletin Vol. B, No. 5, 1971.

or *b.* a magneto-plumbite structure with a formula $(AB)_{12}O_{19}$ where A is a combination of barium, calcium, lead and strontium and B is a combination of iron, aluminum, gallium, cobalt and titanium. A material of this type has been reported by L. G. Van Uitert et al. in Materials Research Bulletin Vol. 15, 1970 at pages 455 to 464.

The material of the substrate must be chosen such that a magnetically permeable circuit layer can be formed therein by means of diffusion, and the crystal structure must be such that it is compatible with the material of the uniaxial magnetic layer for the purposes of magnetic layer formation by epitaxy and to ensure that deleterious chemical reactions do not occur.

When the uniaxial magnetic layer is a garnet structure with the formula $R_3(Fe,M)_5O_{12}$, the substrate can be of the same generic formulation. With a substrate of this type the magnetic permeable circuit is formed, i.e., the magnetic properties are selectively modified, by diffusing the substrate surface with small amounts of either a stable quadravalent ion, for example silicon or possible a combination of germanium, tin, titanium and iridium, or a stable ion with a higher valency that the quadravalent ion, for example niobium, tantalum, tungsten or molybdenum. A typical substrate material having this formula would be $Y_3Fe_{5-x}Ga_xO_{12}$ where $x$ is in the range 0 to 1.0. The cubic anisotropy of this material can be decreased to render certain regions thereof more permeable by diffusing the material surface with cobalt either alone or in combination with silicon. The quadravalent or higher valency ions may be used to generate divalent iron which results in a lower anisotropy and a higher permeability.

In an alternative method according to the invention the thin layer of uniaxial magnetic material can be formed by diffusing the major surface 2 of the substrate 1 of FIG. 1 with a modifying chemical or element. With this arrangement, the major surface 2 would be masked in a manner as outlined in preceding paragraph in relation to FIGS. 2 (A) and 2(B) of the drawings, and the magnetic permeable circuit would be formed by diffusion in a manner as previously outlined but to a depth which is equal to the desired thickness of the uniaxial magnetic layer and the required depth for the magnetic permeable circuit below the uniaxial magnetic layer. After the removal of the diffusion mask the whole of the upper surface 2 is then diffused with the modifying chemical or element to give the uniaxial magnetic layer. Therefore, for this type of structure, the substrate material must be chosen such that a uniaxial magnetic layer, and a magnetically permeable circuit can be formed therein by means of diffusion. The substrate can be of a garnet structure having a similar formula to that outlined in a preceding paragraph, i.e., the material $Y_3Fe_{5-}xGa_xO_{12}$ where $x$ is in the range 0.5 to 1.5. The uniaxial magnetic layer is formed in this material with a single unique easy magnetization direction normal to a major surface of the substrate by incorporating either $Mn^{3+}$, or $Sm^{3+}$, or $Eu^{3+}$, or $Tb^{3+}$ in the surface layer and applying an in-plane biaxial compressive stress in the uniaxial magnetic layer.

In a further alternative method according to the invention a layer of a magnetic material having at least one easy magnetization direction substantially parallel to a major surface thereof can be formed by any known technique on a major surface of a non-magnetic substrate for example, a gallium or an aluminum rich non-magnetic substrate. The magnetic layer forms a substrate layer on or in which the thin uniaxial magnetic layer is formed.

The substrate materials given in preceding paragraphs can also be used for the substrate layer. The method of forming the thin uniaxial magnetic layer and the formation of the permeable circuit in the substrate layer is the same as the method outlined in the preceding paragraphs for the magnetic substrate. This type of structure avoids the need for a deep magnetic substrate crystal which may not be available in sufficient uniformity.

Electrical conductors and possibly further magnetic permeable circuitry which are necessary to provide a functional circular magnetic domain device are formed on the upper surface of the uniaxial magnetic layer.

Electrical conductors are, in general, required as part of the converting devices which convert circular magnetic domains into electrical impulses and vice versa, and as a means for controlling the propagation of the circular magnetic domains. For example, in the case of the read-out arrangement structure illustrated in part in FIG. 4(A) and 4(B) of the drawings, a converting device in the form of an electrical conductor loop can be provided on the upper surface 7 of the layer 6 to give the structure diagrammatically illustrated in FIGS. 5(A) and 5(B) of the drawings. The conductor loop 8 of FIGS. 5(A) and 5(B) is provided on the upper surface 7 by masking this surface by any known technique to expose only that area thereof where the conductor material is to be deposited, depositing the conductor material on the exposed area of the surface 7 by any known technique, and removing the mask.

The further magnetic permeable circuitry which would be formed or deposited on the upper surface 7 of the uniaxial magnetic layer after masking the surface, may be required, especially in conditions of high magnetic domain packing density or high magnetic domain propagation rate (bit rate), in order to achieve improved control of the propagation of the circular magnetic domain within the uniaxial magnetic layer. When only one magnetic permeable circuit is utilized, the walls of the circular magnetic domains can tend, during propagation, to become inclined at an angle to the single unique easy magnetization direction of the uniaxial magnetic layer and this may lead to interaction between adjacent domains. The use of complimentary permeable magnetic circuits, suitably orientated and in register, on both sides of the uniaxial magnetic layer ensures that the circular magnetic domain walls are maintained normal to the major surface of the uniaxial magnetic layer during propagation.

Alternatively, it may be desirable, from say a circuit packing density aspect, for either the circular magnetic domain generation means, propagation means or read-out arrangement to have their magnetic permeable circuitry situated on the same side or opposite sides of the uniaxial magnetic layer, therefore, the further magnetic permeable circuitry could provide the necessary functions as required.

It is to be understood that the foregoing description of specific examples of this invention is made by way of example only and is not to be considered as a limitation in its scope.

What is claimed is:

1. A circular magnetic domain device including a layer of uniaxial magnetic material formed on or in a surface of a magnetic member having at least one easy magnetization direction substantially parallel to the said surface thereof, the layer material having a single unique easy magnetization direction substantially normal to the said surface; a first pattern of a soft magnetic material interposed between the uniaxial magnetic layer and the magnetic member; and a pattern of an electrically conductive material formed on the upper surface of the uniaxial magnetic layer.

2. A circular magnetic domain device as claimed in claim 1 which includes a second pattern of a soft magnetic material formed on the upper surface of the uniaxial magnetic layer.

3. A circular magnetic domain device as claimed in claim 2 wherein the second pattern is complimentary to, and in register with, the first pattern.

4. A circular magnetic domain device as claimed in claim 1 wherein the uniaxial magnetic layer is a single crystal layer.

5. A circular magnetic domain device as claimed in claim 4 wherein the uniaxial magnetic layer material or both the layer material and the material of the magnetic member, is a garnet structure with a formula $R_3(Fe,M)_5O_{12}$, where R is a single or a mixture of rare earth ions, and M is a non-magnetic ion.

6. A circular magnetic domain device as claimed in claim 5 wherein the rare earth ion is yttrium, and wherein the non-magnetic ion is taken from the group consisting of aluminum and gallium.

7. A circular magnetic domain device as claimed in claim 4 wherein the material of the magnetic member is $Y_3Fe_{5-x}Ga_xO_{12}$ where $x$ is in the range 0 to 1.0.

8. A circular magnetic domain device as claimed in claim 4 wherein the uniaxial magnetic layer material is a magneto-plumbite structure with a formula $(AB)_{12}O_{19}$ where A is a combination of barium, calcium, lead and strontium, and B is a combination of iron, aluminum, gallium, cobalt and titanium.

9. A circular magnetic domain device as claimed in claim 1 wherein the magnetic member is formed on the surface of a non-magnetic substrate.

10. A circular magnetic domain device as claimed in claim 9 wherein the substrate material is taken from the group consisting of gallium and an aluminum rich non-magnetic material.

* * * * *